though the plunger from moving inwardly under the influence of the spring. A cable attaches the spacer to the other of the two coupled units so that when the coupled units separate the spacer is disengaged from the plunger, thereby freeing the plunger and enabling the spring to move it into the housing to alter the circuit.

United States Patent
Westenhaver

[15] 3,689,717
[45] Sept. 5, 1972

[54] SWITCH ACTUATED BY THE SEPARATION OF TWO COUPLED UNITS

[72] Inventor: Keith G. Westenhaver, 305 Bourn Ave., Columbia, Mo. 65201

[22] Filed: May 13, 1971

[21] Appl. No.: 143,109

[52] U.S. Cl.............................200/61.19, 340/52 D
[51] Int. Cl.............................................H01h 27/04
[58] Field of Search...................200/61.19, 153 M

[56] References Cited

UNITED STATES PATENTS

| | | | |
|---|---|---|---|
| 2,928,912 | 3/1960 | Molnar | 200/61.19 |
| 3,210,494 | 10/1965 | Murdock | 200/61.19 |
| 2,802,074 | 8/1957 | Pass | 200/61.19 |
| 2,844,675 | 7/1958 | Edgar | 200/61.19 |
| 3,062,326 | 11/1962 | Jones et al. | 200/61.19 X |

*Primary Examiner*—Robert K. Schaefer
*Assistant Examiner*—M. Ginsburg
*Attorney*—Gravely, Lieder & Woodruff

[57] ABSTRACT

A switch alters an electrical circuit when two normally coupled units are separated. The switch includes a housing attached to one of the coupled units, and this housing has a plunger mounted therein which moves inwardly and outwardly with respect to the housing. At its inner end the plunger has a contact which moves toward and away from the fixed contact as the plunger moves so that the circuit is complete when the two contacts are engaged and disrupted when the contacts are separated. A spring urges the plunger to its innermost position in the housing, while a spacer grips the outwardly exposed portion of the plunger and normally prevents the plunger from moving inwardly under the influence of the spring. A cable attaches the spacer to the other of the two coupled units so that when the coupled units separate the spacer is disengaged from the plunger, thereby freeing the plunger and enabling the spring to move it into the housing to alter the circuit.

11 Claims, 5 Drawing Figures

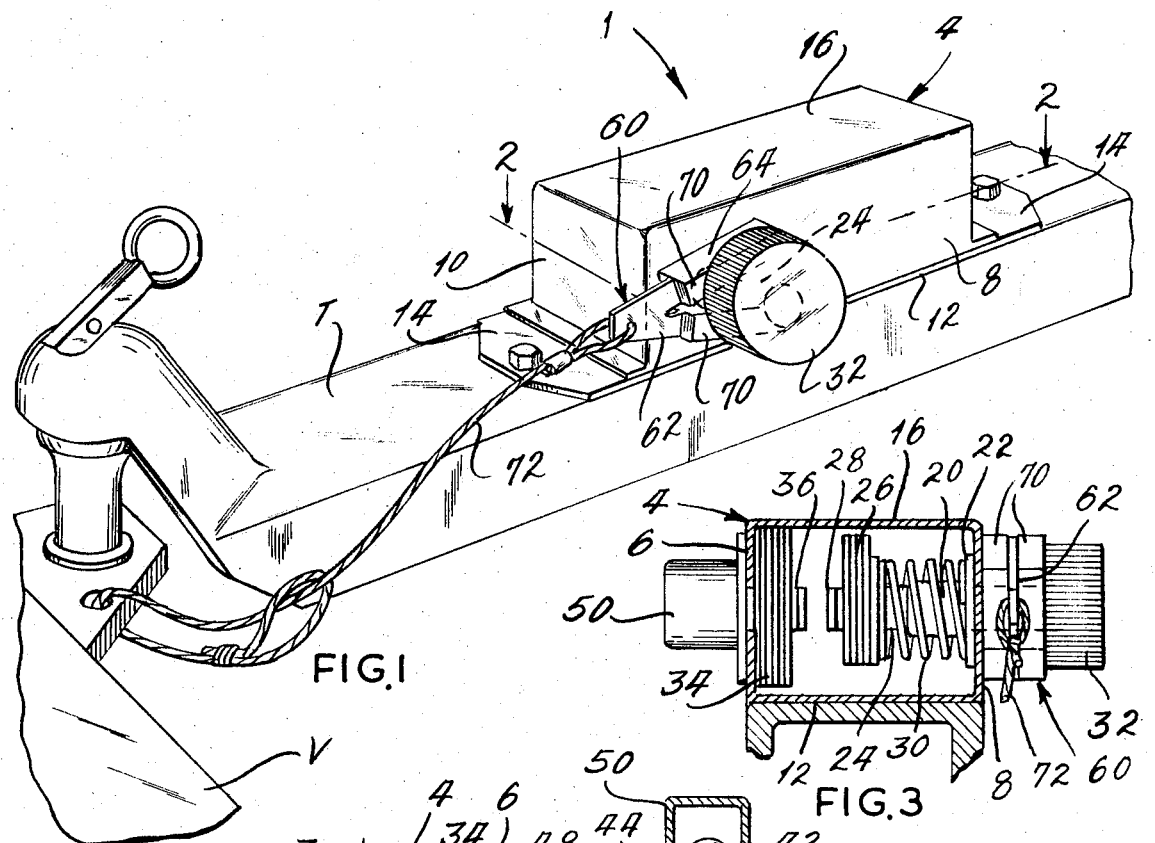

3,689,717

SWITCH ACTUATED BY THE SEPARATION OF TWO COUPLED UNITS

BACKGROUND OF THE INVENTION

This invention relates in general to switches and, more particularly, to a switch which is actuated by the separation of two normally coupled units.

Many vehicles and other devices are normally coupled with other vehicles or devices so that in use they operate as coupled units. Nevertheless, the units are still separable for purposes of storage, repair, and the like. In many of these combinations considerable damage or injury may result should the coupled units become detached while operating together. For example, should a trailer break loose from its tow vehicle, the trailer brakes should be applied immediately, lest the trailer run freely and damage property or perhaps injure a bystander. Similarly, should a boat, tractor, or any motor driven vehicle lose its driver, the motor should be shut down immediately. For this application, the spacer cable would be fastened to the driver.

SUMMARY OF THE INVENTION

One of the principal objects of the present invention is to provide a switch which operates upon the separation of normally coupled units. Another object is to provide a switch of the type stated which is simple and durable in construction, easy to manufacture, and highly reliable. A further object is to provide a switch of the type stated as easily installed on normally coupled units of many different varieties and uses. An additional object is to provide a switch for activating the brakes of a trailer should the trailer break away from the vehicle towing it. These and other objects and advantages will become apparent hereinafter.

The present invention is embodied in a switch having a base means on one of two coupled units. A plunger is mounted on the base means and carries a contact which engages another contact mounted on the base means. Retaining means holds the plunger in one position and is connected to the other coupled unit so that when the units separate the retaining means is disengaged from the plunger and the plunger is free to change position and thereby alter the circuit in which the contacts are located. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a perspective view of a trailer and tow vehicle combination provided with a switch constructed in accordance with and embodying the present invention;

FIG. 2 is a sectional view taken along line 2—2 of FIG. 1;

FIG. 3 is a sectional view taken along line 3—3 of FIG. 2;

FIG. 4 is a fragmentary sectional view showing the spacer block detached from the shaft of a plunger and the contacts in engagement; and FIG. 5 is a sectional view taken along line 5—5 of FIG. 2 and showing the spacer in elevation.

DETAILED DESCRIPTION

Referring now to the drawings, 1 designates a switch including (FIG. 1) a switch housing 4 which constitutes a base structure and has a pair of sidewalls 6 and 8, a pair of end walls 10 connected across the ends of the side walls 6 and 8, and a base wall 12 to which the sidewalls 6 and 8 (FIG. 2) and end walls 10 are affixed. The base wall 12 projects beyond the end walls 10, forming mounting tabs 14 for securing the housing 4 to a supporting structure. The housing 4 also includes a top wall 16 which is connected to the edges of the sidewalls 6 and 8 and end walls 10, forming a closure for the interior of the switch housing 4.

The sidewall 8 of the housing 4 is provided with an aperture 18 (FIG. 2) which aligns with a guide sleeve 20 (FIGS. 2 and 3) disposed within the interior of the housing 4. This sleeve 20 is provided at one of its ends with a flange 22 which abuts against the interior surface of the sidewall 8 and is secured thereto. Thus, the guide sleeve 20 is carried by sidewall 8 and projects inwardly therefrom with its axes perpendicular to the wall 8. The guide sleeve 20 receives an elongated shaft 24 which is somewhat longer than the sleeve 20 and projects beyond both ends thereof. The fit between the shaft 24 and the sleeve 20 is such that the former slides freely within the latter, and no binding or appreciable friction exists. At its inner end the shaft 24 is fitted with a dielectric end block 26 having an electrical contact 28 fastened against its end face which is presented away from sleeve 20. Not only does the dielectric block 26 carry the end contact 28, but it also serves as a stop for preventing complete withdrawal of the shaft 24 from the sleeve 20 and aperture 18. The dielectric block 26 is rectangular in shape and has one of its edges presented close to the top wall 16 so that the block 26 and shaft 24 do not rotate in the housing 4 (FIG. 3).

The shaft 24 is urged inwardly by a coil spring 30 which encircles both the sleeve 20 and the shaft 24. The ends of the spring 30 bear against the dielectric end block 26 and the sleeve flange 22. At its outer end, the shaft 24 is provided with a knob 32 which projects radially outwardly from the shaft 24. Thus, the knob 32 is presented externally of the housing 4 for manual manipulation. The elongated shaft 24, the dielectric end block 26, and the knob 32 in combination constitute a shiftable plunger.

Fastened firmly against the sidewall 6 and located directly opposite to the dielectric end block 26 on the shaft 24 is another dielectric block 34 (FIGS. 2 and 3) and this block, like the block 26, carries an electrical contact 36 which is fastened against the inwardly presented end face thereof. Indeed, the contact 36 aligns with the contact 28 on the end block 26 at the end of the shaft 24 so that when the shaft 24 is not obstructed (FIG. 4), the spring 30 will urge the blocks 26 and 34 together and bring the contacts 28 and 36 into engagement.

The switch housing 4 also contains a bulb socket 40 (FIG. 2) which is fastened against the sidewall 6 and opens outwardly through an aperture 42 in that wall. The socket 40 retains a bulb 44 having a center contact which bears against a base contact 46 at the inner end of the socket 40. The base contact 46 is electrically isolated from the remaining structure of the socket 40, which is grounded to the housing 4, and is connected to the electrical contact 36 and the fixed dielectric block 34 by a wire 48. The bulb 44 is covered by a lens 50 which is also fastened to the side wall 6, but may be removed therefrom to provide access to the bulb 44.

The contact 28 on the movable dielectric block 26 is attached to a wire 56 which leads away from the housing 4 and is connected to one terminal of a source 54 of electrical energy such as a battery. The other terminal of the electrical energy source is connected to ground, or in other words, is common to the housing 4 and the supporting structure on which the housing 4 is mounted. The contact 36 on the dielectric block 34, in addition to being connected to the wire 48, is connected to another wire 52 which also leads from the housing 4 and is connected to an electrically operated appliance or device.

As previously noted, the shaft 24 when unrestrained (FIG. 4) will move inwardly under the force exerted by the compressed spring 30 and will bring the contacts 28 and 36 into engagement, thus completing a circuit through the wires 52 and 56.

The contacts 28 and 36 are normally separated, and this separation is effected by means of a spacer 60 (FIG. 5) which fits between knob 32 and the sidewall 8 and engages the shaft 24. In particular, the spacer 60 includes a relatively narrow tongue 62 which is bifurcated at one end to form a pair of retaining arms 64 having opposed arcuate notches 66. These notches 66 conform to the configuration of the shaft 24 and are spaced apart sufficiently to enable the shaft 24 to fit snugly in them. The opposed inner edges of the arms 64 are further provided with camming edges 68 which lead up to the notches 66, converging as they do. Fastened against the relatively flat side faces of the arms 64 are spreader blocks 70.

To install the spacer 60 on the shaft 24, the knob 32 is withdrawn from the housing 4 to expose the shaft 24, the amount of withdrawal being such that the spacing between the knob 32 and the sidewall 8 exceeds the thickness of the spacer 60 at the spreader blocks 70 thereon. Once the shaft 24 is so withdrawn, the spacer 60 is fitted between the knob 32 and the sidewall 8 and its opposed camming edges 68 are brought against the cylindrical surface of the shaft 24 on each side thereof. Thereupon the spacer 60 is forced radially toward the shaft 24, and this causes the camming edges 68 to pass over the surface of the shaft 24, which in turn spreads the retaining arms 64, causing them to deform in opposition to the natural resiliency of the material from which they are formed. After passing along the camming edges 68, the shaft 24 encounters the arcuate notches 66, at which time the arms 64 snap together and tightly engage the shaft surface at the edges of those notches 66.

The disposition of the spacer 60 between the knob 32 and the sidewall 8 maintains the shaft 24 in an outwardly presented position and keeps the spring 30 compressed. Thus, the opposed faces of the housing 8 and the knob 32 serve as abutment surfaces which normally abut the side faces of the spacer 60. Since the retaining arms 64 tightly engage the shaft 24 at the notches 66, the spacer 60 is retained in engagement with the shaft 24 and does not work loose even when subjected to vibrations, jolts and the like.

Normally, the housing 4 is mounted on one of two coupled units and the tongue 62 is connected to the other unit by a cable 72 (FIG. 1) which extends through the end of the tongue 62 located remote from the retaining arms 64. The cable 72 must be strong enough to withstand a tensile force sufficient in magnitude to disengage the spacer 60 from the shaft 24 and withdraw it from the housing 4. As an example, the housing 4 may be bolted to the tongue of an automotive-type trailer T, whereas the steel cable 72 may be attached securely to the tow vehicle V which may be an automobile. Assuming that the trailer has electric brakes, the wire 52 should lead to the brake circuit and should be connected such that the electric brakes are energized when the contacts 28 and 36 of the switch 1 engage. In such an arrangement detachment of the trailer T from the tow vehicle V will pull the spacer 60 from the shaft 24 and will further withdraw it from the space between the knob 32 and the housing sidewall 8. Once the spacer 60 is free of the knob 32, the spring 30 drives the end block 26 and shaft 24 inwardly until the contact 28 on the block 26 engages the contact 36 on the fixed dielectric block 34. When this occurs, the circuit from the battery 54 to the trailer brakes is closed so that the forward motion of the trailer is retarded. In other words, once the contacts 28 and 36 engage each other current flows from the electrical energy source 54 through the wire 56, the engaged contacts 28 and 36, and the wire 52 to the brake actuating mechanism. The engagement of the contacts 28 and 36 will also place the battery 54 across the light bulb 44, so that the bulb 44 is energized and signifies that the circuit though the switch 1 is closed.

The switch 1 may also be used as a safety switch for a boat, tractor, or any motor-driven vehicle which requires a driver for control of the vehicle. In such instances the warning light 44 and bulb socket 40 would not be used, and the switch 1 would be wired in series with the distributor or spark plug, as the case may be, of the vehicle, using ignition type insulated wire. The wire 56 would be connected to the vehicle ignition as above stated, and wire 52 would be connected to the vehicle ground. The cable 72 would be attached to the driver so that if the driver were thrown from the vehicle he would withdraw the spacer 60. Consequently, when the spacer 60 is disengaged from the shaft 24, the spring 30 will drive the dielectric block 26 inwardly until the contacts 28 and 36 engage, thereby grounding the vehicle ignition system and stopping the driverless vehicle.

Where the actuated device draws considerable current, the switch 1 may be used to operate a relay switch which in turn opens and closes the circuit to the actuated device.

The switch 1, of course, may be supplied without the warning light formed by the bulb socket 40 and the bulb 44 which fits therein.

This invention is intended to cover all changes and modifications of the example of the invention herein chosen for purposes of the disclosure which do not constitute departures from the spirit and scope of the invention.

What is claimed is:

1. A switch for use with two coupled units; said switch comprising: support means including a base attached to one of the coupled units and having an abutment surface thereon; an elongated element mounted on the base and shiftable thereon in the direction of its longitudinal axis between first and second positions, the elongated element projecting beyond the abutment surface on the base and having an abutment surface thereon which is presented opposite the abutment surface on the base so that the distance between the abutment surfaces varies as the elongated element shifts, the abutment surfaces being spaced apart when the elongated element is in its second position; an electrical contact carried by and shiftable with the elongated element; another electrical contact mounted on the base and aligned with the contact on the elongated element; the electrical contacts being engaged when the elongated element is in one of its positions and being spaced apart when the elongated element is in the other position; a spring carried by the base for urging the elongated element to its first position; and a spacer engageable with and positioned between the two abutment surfaces for holding the elongated element in its second position in opposition to the force exerted by the spring, the spacer being disengageable from the abutment surfaces to permit the spring to move the elongated element to its first position, the spacer being further connected with the other of the two coupled units so that when the units separate the spacer will disengage the abutment surfaces and the spring will move the elongated element to its first position.

2. A switch according to claim 1 wherein the spacer is bifurcated and has retaining arms which fit around each side of the elongated element.

3. A switch according to claim 2 wherein at least one of the arms is provided with a notch which receives the elongated element.

4. A switch according to claim 3 wherein the notched arm has a camming surface leading up to the notch therein, the camming surface being positioned to engage the outer surface of the elongated element and configured to spread the arms as the arms are advanced across the opposite sides of the elongated element.

5. A switch according to claim 1 wherein the base includes a sleeve through which the elongated element fits; and wherein the spring is a coil spring which encircles the sleeve and the elongated element.

6. A switch according to claim 5 wherein the support means includes a housing enclosure the sleeve is fastened.

7. A switch according to claim 5 wherein the support means includes a housing carrying a first dielectric block on which one of the electrical contacts is mounted; and wherein the elongated element carries a second dielectric block on which the other electrical contact is mounted; and wherein the spring at one of its ends bears against the second dielectric block.

8. A switch according to claim 6 wherein the elongated element projects beyond the housing and at its outer end is enlarged, and wherein the spacer fits between the enlarged end thereof and the housing.

9. A switch according to claim 1 wherein the elongated element is enlarged at one end and the abutment surface of the elongated element is on the enlarged end.

10. A switch according to claim 9 wherein the base includes a housing which encloses the contacts, and the elongated element projects through a wall of the housing and has its enlarged end positioned externally of the housing, the abutment surface of the base being on the housing wall through which the elongated element projects.

11. A switch according to claim 10 wherein the spacer has spaced apart arms and an outwardly opening notch between the arms; and wherein the notch receives the elongated element such that the arms of the spacer are between the abutment surfaces of the housing and the elongated element and prevent the elongated element from assuming its first position.

* * * * *

UNITED STATES PATENT OFFICE
CERTIFICATE OF CORRECTION

Patent No. 3,689,717    Dated September 5, 1972

Inventor(s) Keith G. Westenhaver

It is certified that error appears in the above-identified patent and that said Letters Patent are hereby corrected as shown below:

Column 6, line 8, after "enclosure" insert --- to which ---.

Signed and sealed this 15th day of May 1973.

(SEAL)
Attest:

EDWARD M. FLETCHER, JR.
Attesting Officer

ROBERT GOTTSCHALK
Commissioner of Patents